United States Patent
Yamaguchi

[11] Patent Number: 6,126,105
[45] Date of Patent: Oct. 3, 2000

[54] ANTIBACKLASH BRAKE WITH CENTRIFUGAL OPERATOR

[75] Inventor: Nobuyuki Yamaguchi, Tokyo, Japan

[73] Assignee: Daiwa Seiko, Inc., Tokyo, Japan

[21] Appl. No.: 09/265,397

[22] Filed: Mar. 10, 1999

[30] Foreign Application Priority Data

Mar. 10, 1998 [JP] Japan .................................. 10-058216

[51] Int. Cl.$^7$ ............................................. A01K 89/0155
[52] U.S. Cl. ......................... 242/288; 242/289; 188/82.7; 188/164
[58] Field of Search .................................. 242/288, 289; 188/161, 164, 166, 82.7, 82.9

[56] References Cited

U.S. PATENT DOCUMENTS

| 4,390,140 | 6/1983 | Karlsson et al. | 242/289 |
|---|---|---|---|
| 4,535,954 | 8/1985 | Worth et al. | 242/288 |
| 4,601,438 | 7/1986 | Young | 242/289 |
| 5,301,899 | 4/1994 | Sato | 242/288 |
| 5,308,021 | 5/1994 | Ikuta | 242/288 |
| 5,318,245 | 6/1994 | Sato et al. | 242/288 |
| 5,362,011 | 11/1994 | Sato | 242/289 |
| 5,865,387 | 2/1999 | Hirano | 242/289 |

FOREIGN PATENT DOCUMENTS

| 6-8695 | 10/1988 | Japan . |
|---|---|---|
| 6-16511 | 1/1991 | Japan . |
| 3-79665 | 8/1991 | Japan . |

*Primary Examiner*—Katherine A. Matecki
*Attorney, Agent, or Firm*—Liniak, Berenato, Longacre & White

[57] ABSTRACT

In a double bearing type reel (1) for fishing, a spool (3) is fixed to a spool shaft (5) pivotally supported by a reel body so that the spool (3) rotates integrally with the spool shaft (5). A movable body (25) is attached to the spool shaft (5) so that the movable body (25) rotates integrally with the spool shaft (5). The movable body (25) is capable of moving in the axial direction of the spool shaft (5). A centrifugal force operation arm (34) is rotated by a centrifugal force generated by the rotation of the spool (3) so as to move the movable body (25) in the axial direction of the spool shaft (5). A braking force generating means (13, 14) is provided for giving a braking force acting on the spool (3) via the movable body (25) when the movable body (25) is moved along the spool shaft (5) by a predetermined distance so that the braking force corresponds to a distance of movement of the movable body 25.

7 Claims, 8 Drawing Sheets

ANTIBACKLASH BRAKE WITH CENTRIFUGAL OPERATOR

BACKGROUND OF THE INVENTION

The present invention relates to a double bearing type or baitcasting type reel for fishing.

It is a conventional method to give a braking force to a rotating spool so as to prevent the occurrence of backlash caused by an excessive rotation of the spool in the case of releasing a fishing line, for example, in the case of casting a fishing line. As a backlash preventing device for giving a braking force to the rotating spool, there is known a centrifugal force braking device (Japanese Unexamined Utility Model Publication No. 3-79665) in which a centrifugal force generated by the rotation of the spool is used, and also there are known magnetic braking devices (Japanese Examined Utility Model Publication Nos. 6-8695 and 6-16511) in which a magnetic force is used for braking.

The above centrifugal force braking device is operated as follows. By a centrifugal force generated when a spool is rotated, a braking plate rotating integrally with the spool is moved in the radial direction of the spool, so that the braking plate is made to come into sliding contact with a predetermined portion of a reel body and a frictional force is generated. The spool is given a braking force by the frictional force.

The above magnetic braking device is operated as follows. An electric conductor rotating integrally with a spool is positioned in a magnetic field formed by a magnet. By an electromagnetic force generated by the rotation of the electric conductor, the electric conductor is given a braking force, and at the same time the spool rotating together with the electric conductor is given a braking force.

However, in the above centrifugal braking device, the frictional force generated by the centrifugal force (i.e. the frictional force is generated between a braking piece moved by the centrifugal force and a reel body with which the braking piece comes into contact) is proportional to the square of a rotational speed of the spool. Therefore, when a rotational speed of the spool is increased higher than a predetermined value after the start of casting, the frictional braking force is suddenly increased, and the rotational speed of the spool is suddenly decreased. Accordingly, a flying distance of a fishing tackle is reduced. When the rotational speed of the spool is decreased at the end of casting, the frictional force is greatly decreased, and the phenomenon of backlash tends to occur. In this case, an appropriate thumbing operation is required, but the appropriate thumbing operation, in turn, requires the skill. It is, therefore, difficult for a beginner to conduct a thumbing operation appropriately. Since braking is conducted by a frictional force, noise is generated, and further, problems may be encountered in the viewpoints of durability and maintenance of the performance.

In this connection, in Japanese Unexamined Patent Publication No. 5-68455, there is proposed a reel for fishing in which a plurality of centrifugal braking devices are combined with each other so that a braking force is successively given to a spool by two steps. However, the above type reel for fishing is disadvantageous in that the structure becomes complicated and the size of the entire reel is extended. As a result, the manufacturing cost is raised.

On the other hand, in the aforementioned magnetic braking device, the braking force is changed substantially in proportion to the rotational speed of the spool. Accordingly, unlike the centrifugal braking device, there is no possibility that the braking force is greatly changed according to a change in the rotational speed of the spool. Therefore, the phenomenon of backlash is unlikely to occur, and it is easy for a beginner to conduct casting. However, this type reel for fishing is disadvantageous as follows. While the spool is rotating, a braking force corresponding to the rotational speed of the spool is generated at all times. Accordingly, even at the end of casting in which the rotational speed of the spool is decreased, the braking force acts on the spool. Therefore, it is impossible to extend a flying distance of the fishing tackle. Further, since the freely rotating performance of the spool is deteriorated by the magnetic action, it is impossible to raise a rotational speed of the spool quickly. Therefore, this type reel for fishing is not suitable for shot casting in which the fishing tackle is cast in a short distance.

SUMMARY OF THE INVENTION

The present invention has been accomplished in view of the above circumstances. It is an object of the present invention to provide a double bearing type reel for fishing, the structure of which is simple, the flying distance of which can be extended while the occurrence of backlash is suppressed by an appropriate braking action.

In order to solve the above problems, the present invention provides a double bearing type or baitcasting type reel for fishing comprising: a spool fixed to a spool shaft pivotally supported by a reel body, the spool rotating integrally with the spool shaft, a fishing line being wound round the spool; a movable body attached to the spool shaft, the movable body rotating integrally with the spool shaft, the movable body being capable of moving in the axial direction of the spool shaft; a centrifugal force operation arm rotated by a centrifugal force generated by the rotation of the spool, the centrifugal force operation arm moving the movable body in the axial direction of the spool shaft; and a braking force generating means for giving a braking force, which corresponds to a distance of movement of the movable body when the movable body is moved along the spool shaft by a predetermined distance, to the spool via the movable body.

The present disclosure relates to the subject matter contained in Japanese patent application No. Hei. 10-58216 (filed on Mar. 10, 1998), which is expressly incorporated herein by reference in its entirety.

DESCRIPTION OF THE PREFERRED EMBODIMENT

Referring to the accompanying drawings, embodiments of the present invention will be explained below.

Figure 1:
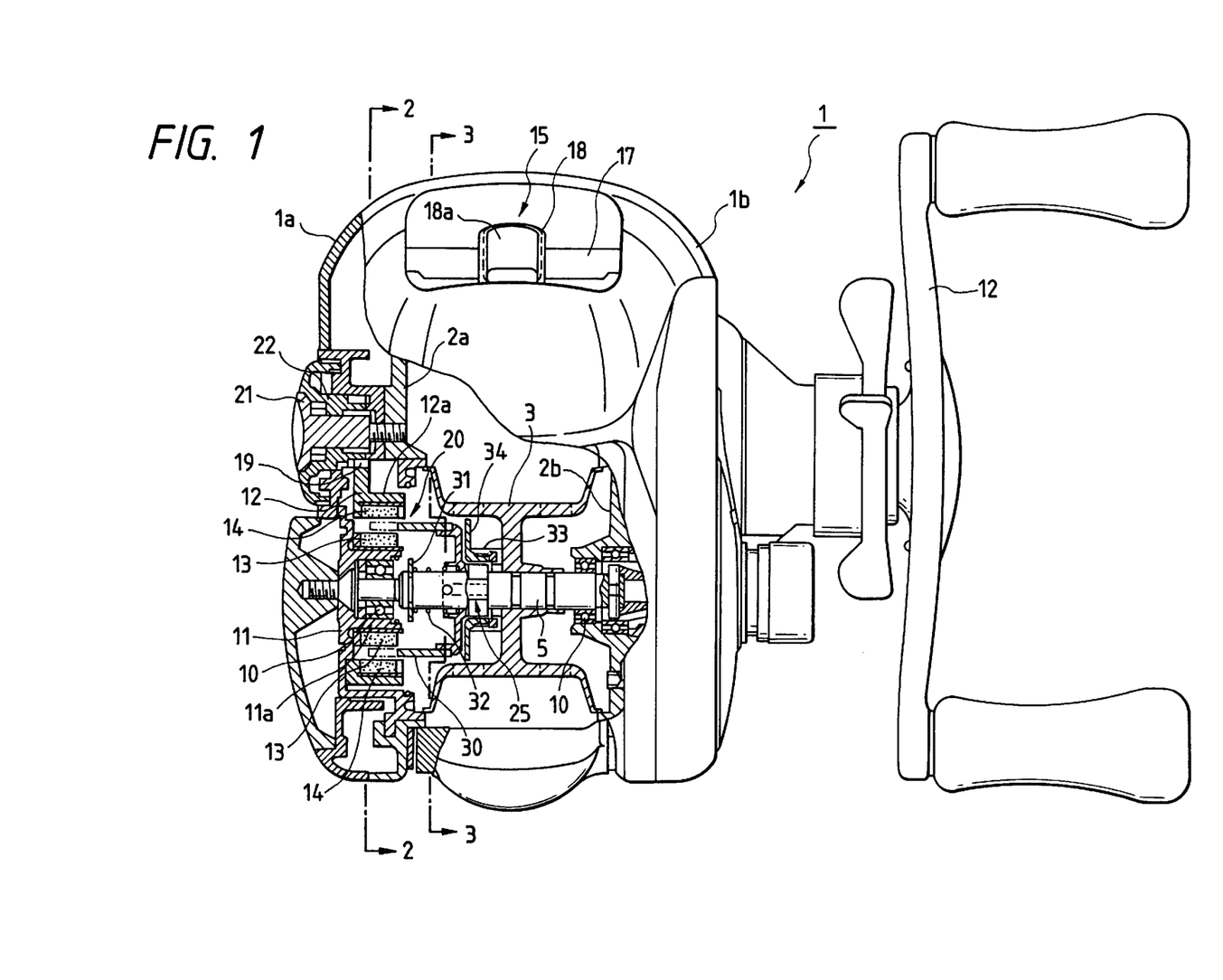
FIG. 1 is a partially cross-sectional overall arrangement view of a double bearing type reel for fishing of the first embodiment of the present invention.

FIGS. 1 to 8 are views showing a first embodiment of the present invention. As shown in FIG. 1, a double bearing type or a baitcasting type reel for fishing of this embodiment includes a left side plate 1a, a right side plate 1b and a reel body having a right 2b and a left frame 2a which are covered with both side plates 1a, 1b. A spool shaft 5 is rotatably supported by bearings 10, 10 between the right 2b and the left frame 2a. A spool 3 onto which a fishing line is wound is integrally fixed to the spool shaft 5.

A pinion (not shown in the drawing) movable in the axial direction of the spool shaft 5 is attached to an end of the spool shaft 5 protruding from the right frame 2b. This pinion is moved between an engaging position at which the pinion is engaged and rotated integrally with the spool shaft 5 and a non-engaging position at which the pinion is disengaged from the spool shaft 5. The pinion is meshed with a drive gear (not shown in the drawing), and a handle 12 is attached to an end of a handle shaft (not shown in the drawing) which is fixed to the drive gear. Due to the above structure, when the handle 12 is rotated, the spool shaft 5 is rotated via the drive gear and the pinion. Accordingly, the spool 3 is rotated.

Between the right 2b and the left frame 2a, there is provided a level wind device 15 on the side of drawing out the fishing line from the spool 3. This level wind device 15 includes: a traverse shaft (not shown), on the outer circumferential surface of which a traverse groove is formed, at the end of which a gear meshed with the drive gear is attached; a cylindrical body 17 in which the traverse shaft is accommodated; and an engaging piece 18 engaged with the traverse groove, wherein the engaging piece 18 slides in the transverse direction along the cylindrical body 17 when the traverse shaft is rotated. The fishing line wound round the spool 3 is guided via a hole 18a formed in the engaging piece 18. Accordingly, when the handle 12 is rotated, the spool 3 is rotated and the engaging piece 18 is slid in the transverse direction. Therefore, the fishing line can be uniformly wound round the spool 3.

Figure 2:
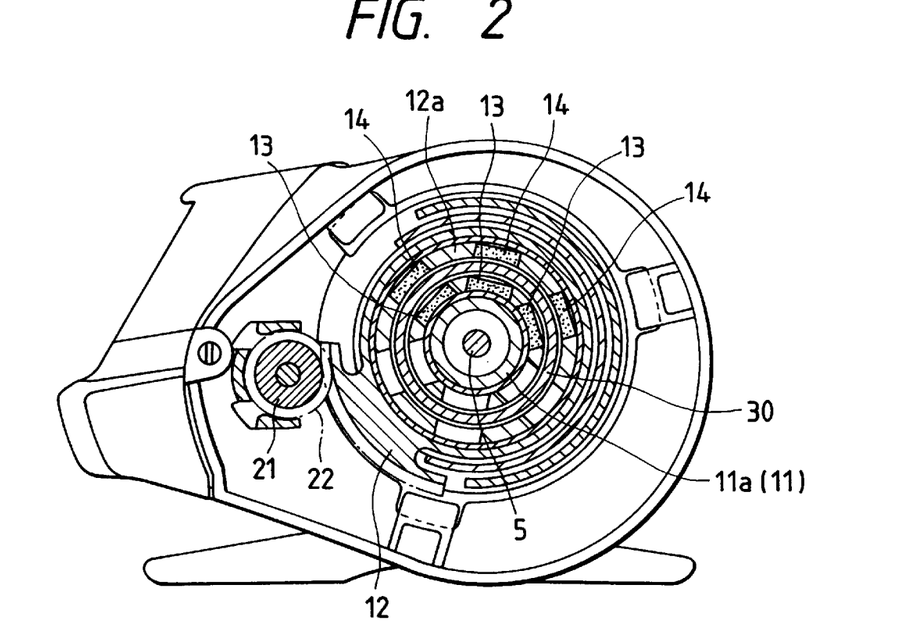
FIG. 2 is a cross-sectional view taken on line 2—2 in FIG. 1.
Figure 3:
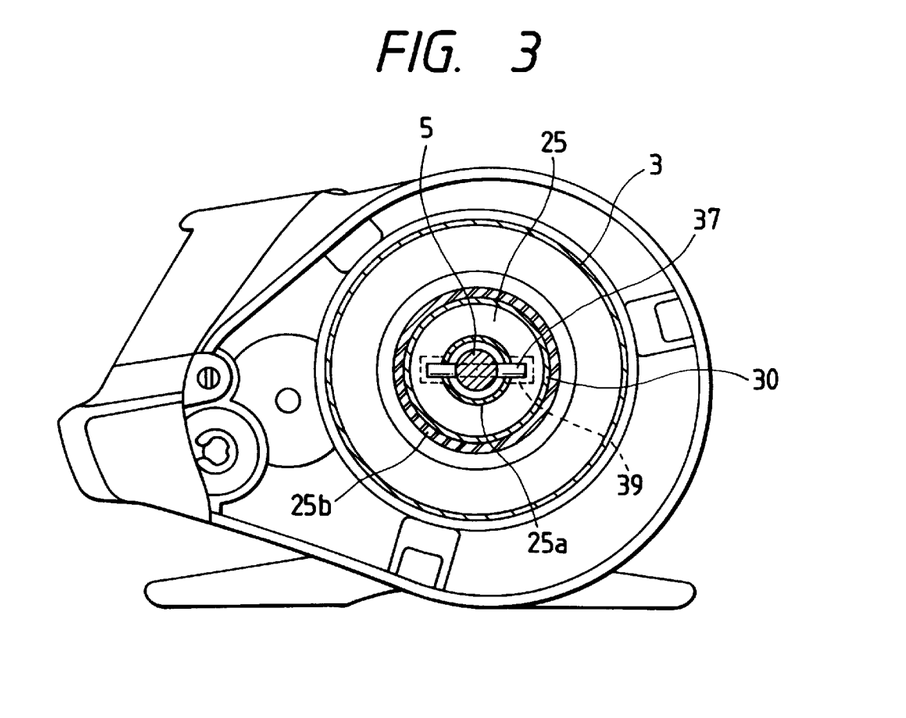
FIG. 3 is a cross-sectional view taken on line 3—3 in FIG. 1.

The double bearing type reel for fishing of this embodiment includes a magnetic braking device 20 for preventing the spool 3 from rotating excessively in the motion of drawing out a fishing line. As shown in FIGS. 1 and 2, the magnetic braking device 20 includes two annular bodies 11, 12 made of magnetic material. In this case, the first annular body 11 is fixed to the reel body, and the second annular body 12 is rotatably held by the reel body.

The first annular body 11 holds a bearing 10 for supporting one end of the spool shaft 5. The first annular body 11 has a first annular magnet holding section 11a which extends inwardly in the axial direction of the spool shaft 5. The second annular body 12 has a second annular magnet holding section 12a which is concentrically arranged outside the first magnet holding section 11a.

On an outer circumferential surface of the first magnet holding section 11a, there are provided a plurality of magnets 13 which are arranged in the circumferential direction at predetermined intervals. In this embodiment, there are provided three magnets 13 as shown in FIG. 2. On an inner circumferential surface of the second magnet holding section 12a, there are provided a plurality of magnets 14 which are arranged in the circumferential direction at predetermined intervals and these magnets 14 are opposed to the aforementioned magnets 13 arranged inside. In this embodiment, there are provided three magnets 14 as shown in FIG. 2.

The polarity of the magnet 13 held by the first magnet holding section 11a on the side opposed to the magnet 14 held by the second magnet holding section 12a is different from the polarity of the adjacent magnet 13. The polarity of the magnet 14 held by the second magnet holding section 12a on the side opposed to the magnet 13 held by the first magnet holding section 11a is different from the polarity of the adjacent magnet 14.

As shown in FIG. 1, on the left side plate 1a, there is provided a knob 21, which can be rotated, for adjusting a braking force. A gear 22 rotated integrally with the knob 21 is fixed to the knob 21 for adjusting a braking force. This gear 22 is meshed with teeth 19 formed on an outer circumferential surface of the second annular body 12. Due to the above structure, when the knob 21 for adjusting a braking force is rotated, the second annular body 12 is rotated with respect to the first annular body 11 via the gear 22. Therefore, a relation between the polarities (N-N, N-S) of the magnets 13, 14 which are opposed to each other is changed, and also a quantity of overlapping is changed. In other words, a direction and an intensity of the magnetic field formed by the magnets 13, 14 are changed.

Figure 4:
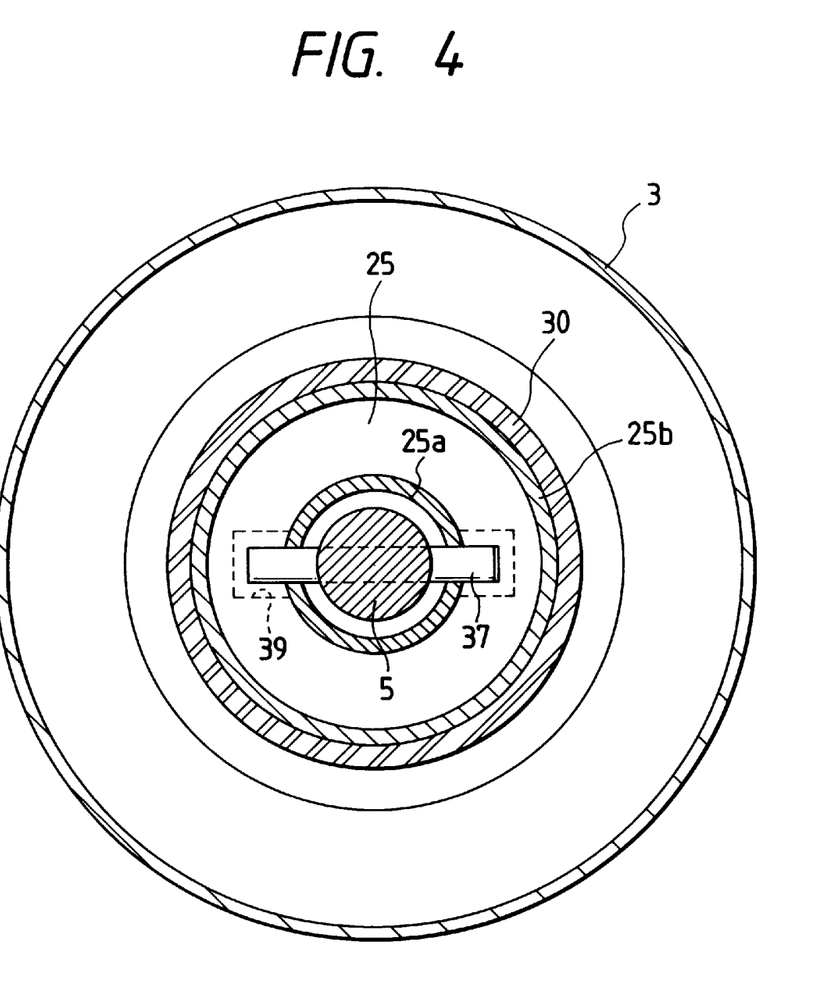
FIG. 4 is an enlarged view of a primary portion of FIG. 3.
Figure 7:
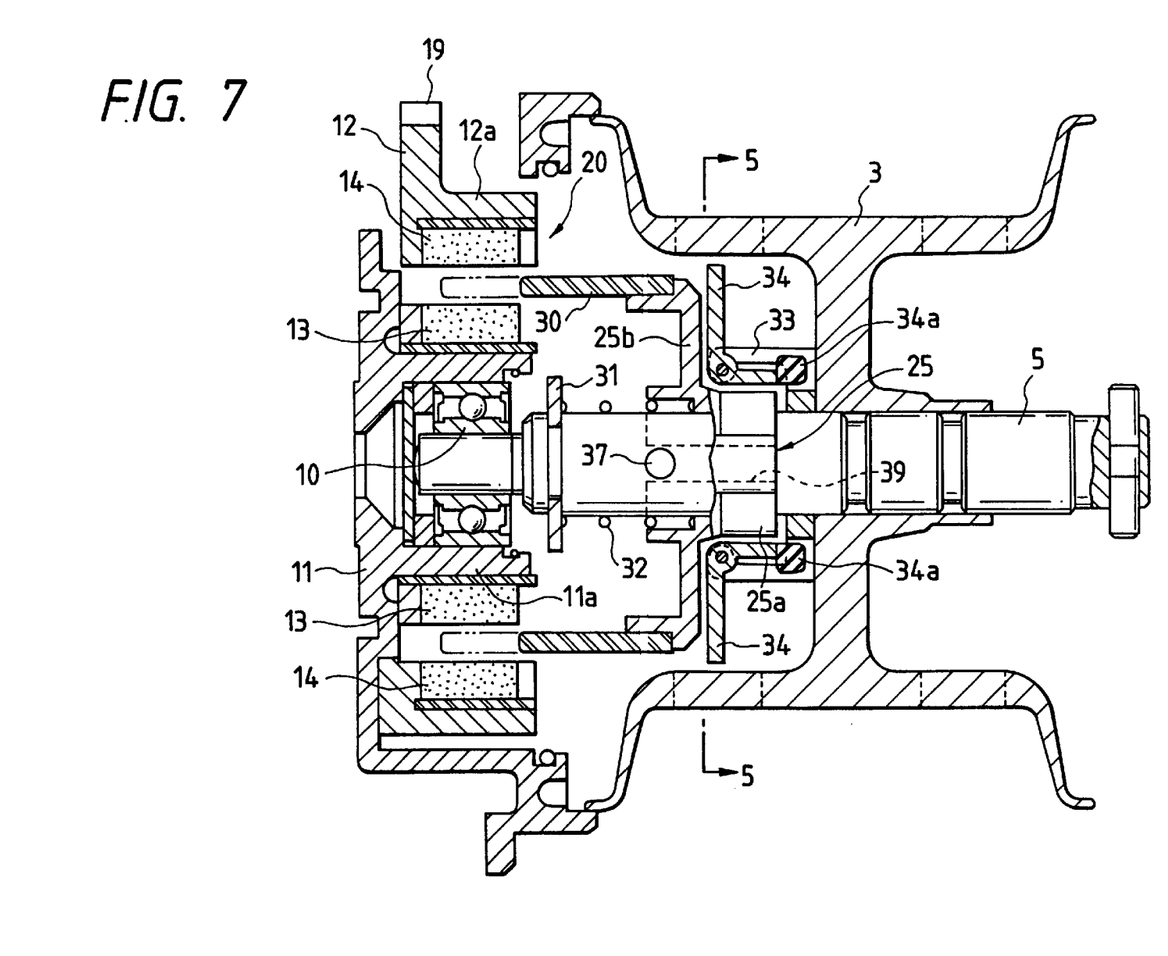
FIG. 7 is a cross-sectional side view of a primary portion of the reel shown in FIG. 1, wherein this view shows a state in which the spool is rotated at low speed or stopped.

The magnetic braking device 20 is provided with a movable body 25 movably attached to the spool shaft 5. As the detail is shown in FIGS. 4 and 7, the movable body 25 includes a cylindrical body 25a movably attached to an outer circumference of the spool shaft 5 and a flange section 25b extending outwardly from the main body 25a in the radial direction of the spool shaft 5. An annular electric conductor 30 extending in the axial direction of the spool shaft 5 is fixed to the flange section 25b so that the annular electric conductor 30 can be opposed to an annular space formed between the magnets 13, 14 and also the annular electric conductor 30 can be inserted into and drawn out from the annular space.

There is provided a compression spring 32 between the retainer 31 fixed to one end of the spool shaft 5 and the main body 25a of the movable body 25. This compression spring 32 is wound around an outer circumferential surface of the spool shaft 5 and pushes the movable body 25 to the spool 3 side so that the movable body 25 can be separated from the retainer 31.

In order to move the cylindrical body 25a in the axial direction of the spool shaft 5 without rotating the cylindrical body 25a with respect to the spool shaft 5 while the cylindrical body 25a is being rotated integrally with the spool shaft 5, long grooves 39 extending in the longitudinal direction of the cylindrical body 25a are formed in two portions on the inner circumferential surfaces of the cylindrical body 25a, and pins 37 engaging with these long grooves 39 are protruded from the spool shaft 5.

Figure 5:
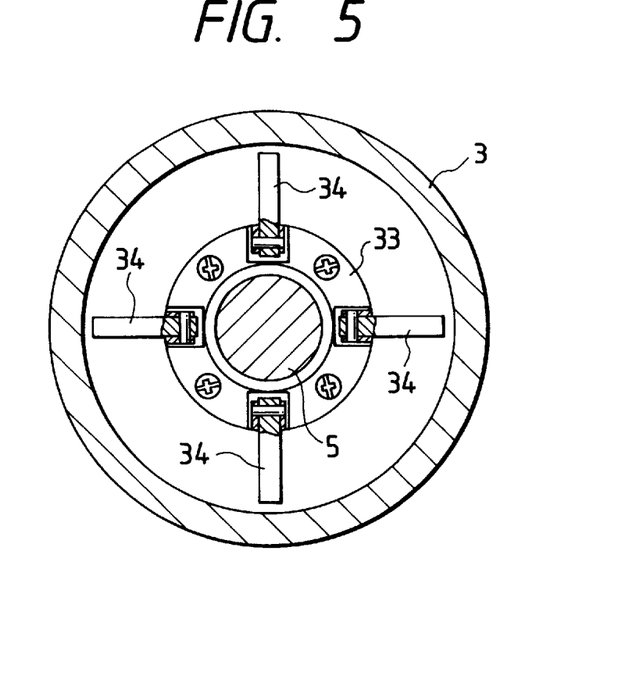
FIG. 5 is a cross-sectional view taken on line 5—5 in FIG. 7.
Figure 6:
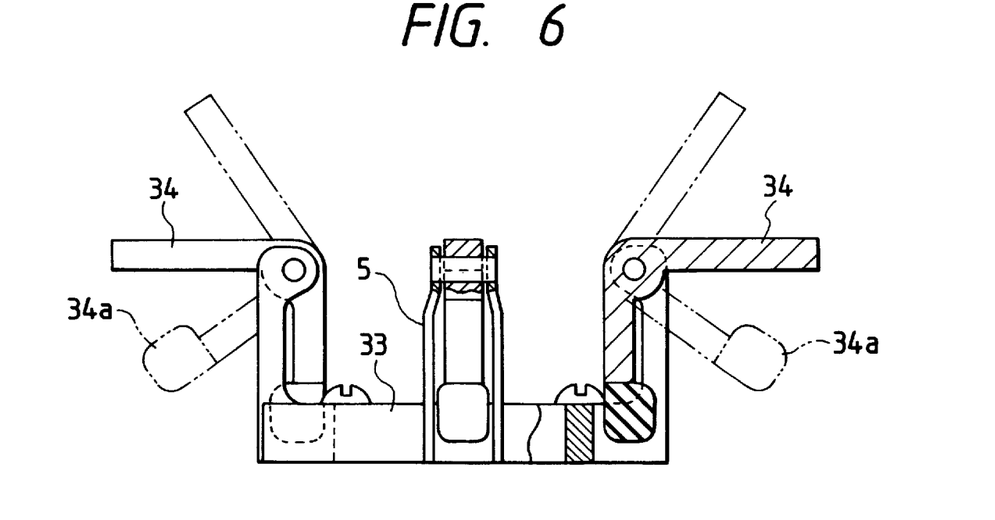
FIG. 6 is a side view of a centrifugal force operation arm attached to a spool support.

An annular support 33 is fixed to the spool 3. As the detail is shown in FIGS. 5 to 7, there are provided a plurality of centrifugal force operation levers 34 in this support body 33 in such a manner that the levers are opposed to the flange section 25b of the movable body 25. In this embodiment, four centrifugal force operation levers 34 are provided. The plurality of centrifugal force operation levers 34 are pivotally attached to the support body 33 and arranged at predetermined angular intervals in the circumferential direction of the support body 33. At an end portion of each centrifugal force operation lever 34, there is provided an inertial body (weight) 34a so that the centrifugal force operation lever 34 can be given an angular moment when a centrifugal force is acting on it by the rotation of the spool 3.

Next, operation of the double bearing type reel for fishing of the above structure will be explained below.

For example, when the spool 3 is rotated by casting the fishing tackle, the centrifugal force operation lever 34 is also rotated integrally with the spool 3. Accordingly, a centrifugal force acts on the inertial body 34a, so that the centrifugal force operation lever 34 is pivotally rotated and pushed against a back of the flange section 25b of the movable body 25.

Until the rotational speed of the spool 3 reaches a predetermined value at the beginning of casting, a centrifugal force acting on the inertial body 34a is low. Therefore, a pushing force of the centrifugal force operation lever 34 acting on the flange section 25b of the movable body 25 is lower than a pushing force of the compression spring 32. Accordingly, as shown in FIG. 7, the movable body 25 is not moved with respect to the spool shaft 5 in the axial direction, that is, the movable body 25 is kept at the substantially same position as that of the spool 3 which is stopped. In other words, the electric conductor 30 attached to the movable body 25 is not inserted into the annular space formed between the magnets 13 and 14. Therefore, no braking force is generated by magnetism in the spool 3. As a result, the spool 3 can be freely rotated, that is, the rotational speed of the spool 3 can be increased, and a length of the fishing line which has been cast is increased, that is, a flying distance of the fishing tackle is extended.

Figure 8:
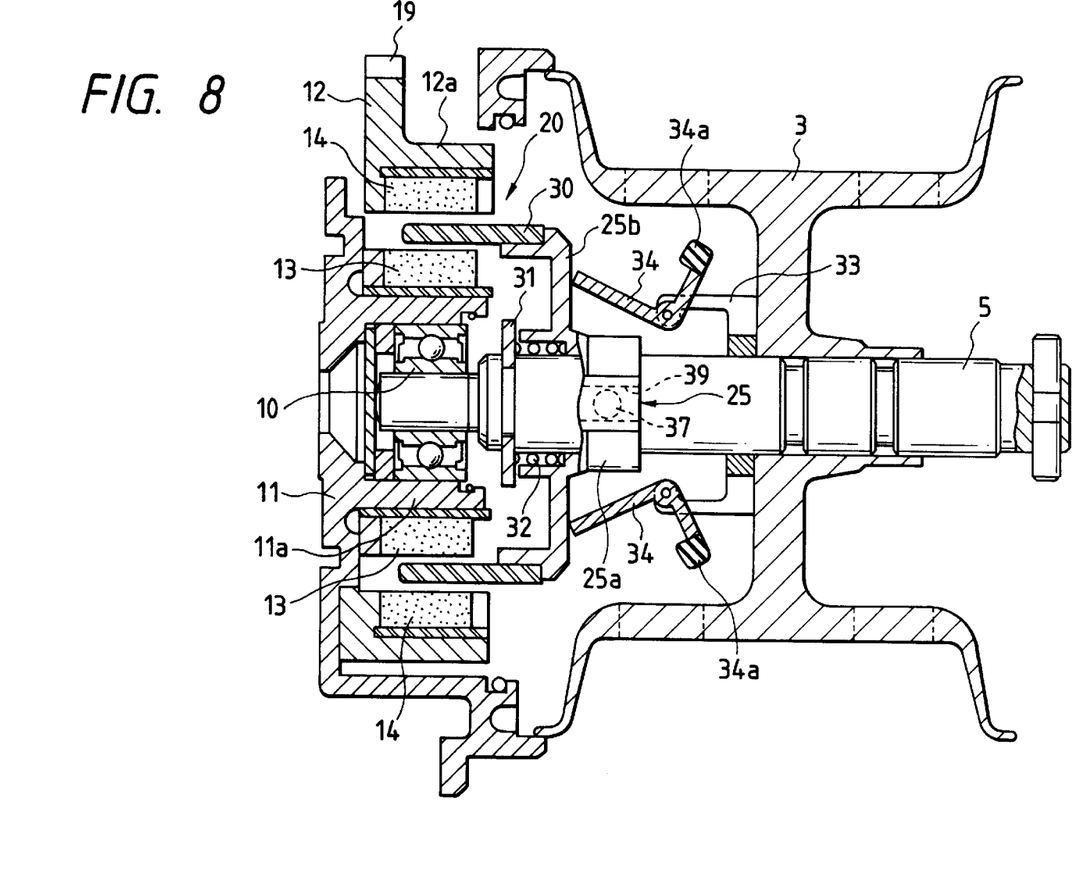
FIG. 8 is a cross-sectional side view of a primary portion of the reel shown in FIG. 1, wherein this view shows a state in which the spool is rotated at high speed.

After that, when the rotational speed of the spool 3 is increased and the centrifugal force acting on the inertial body 34a exceeds a predetermined value, that is, when the pushing force of the centrifugal force operation lever 34 acting on the movable body 25 becomes higher than the pushing force of the compression spring 32, the movable body 25 starts moving against the pushing force of the compression spring 32 due to the pushing action of the rotating centrifugal force operation arm 34. In this case, since the long grooves 39 formed on the inner circumferential surface of the movable body 25 are engaged with the pins 37 of the spool shaft 5, the movable body 25 is moved in the axial direction of the spool shaft 5 without being rotated around the spool shaft 5. Due to the above movement of the movable body 25, the electric conductor 30 enters an annular space (magnetic field) formed between the magnets 13 and 14 as shown in FIG. 8, and the electric conductor 30 is given a force from the magnetic field according to a distance of the intrusion and a rotational speed. Accordingly, a braking force is generated in the spool 3 rotating integrally with the electric conductor 30. That is, the spool 3 is given a braking force according to its rotational speed. As a result, the spool 3 is prevented from rotating excessively, and the occurrence of backlash can be suppressed.

At the end of casting, when the rotational speed of the spool 3 is decreased and the centrifugal force acting on the inertial body 34a is reduced, that is, when the pushing force of the centrifugal force operation lever 34 becomes lower than the pushing force of the compression spring 32, the movable body 25 starts returning to the initial position by the pushing force of the compression spring 32. Due to the foregoing, the electric conductor 30 gradually comes out from the annular space (magnetic field) formed between the magnets 13 and 14. Therefore, an intensity of force given from the magnetic field is reduced. When the electric conductor 30 completely comes out from the annular space, no braking force generated by magnetism is given to the spool 3. Accordingly, the spool 3 can be freely rotated and the fishing line can be freely cast.

In this connection, since the braking force adjusting knob 21 can be rotated by a predetermined amount of rotation to change a relation of polarity (N-N, N-S) of the magnets 13, 14 opposed to each other and a quantity of overlapping, a direction and an intensity of the magnetic field formed by the magnets 13, 14 are changed. Therefore, the electromagnetic force acting on the electric conductor 30 can be adjusted in advance of the casting operation, that is, the braking force acting on the spool can be adjusted.

As described above, in contrast to the conventional fishing reel in which the braking force is given to the rotation of the spool 3 at all times, the double bearing type reel 1 for fishing of this embodiment is designed such that no braking force acts on the spool 3 when the rotational speed of the spool 3 is low, and the spool 3 is allowed to rotating freely. Only when the rotational speed of the spool 3 is increased to a predetermined value, the spool 3 is given a braking force, the intensity of which corresponds to the rotational speed. That is, in the middle of casting in which the spool 3 is rotated at high speed, the spool 3 is given an appropriate intensity of braking force, so that the occurrence of backlash can be suppressed. At the beginning and the end of casting, the spool 3 can be freely rotated without any suppression to the rotational speed of the spool 3. Accordingly, it is possible to prevent the rotational speed of the spool 3 from decreasing suddenly in the process of casting. Also it is possible to prevent the spool 3 from rotating excessively in the process of casting. Further, it is possible to remarkably extend a flying distance of the fishing tackle. Furthermore, the fishing tackle can reach a target point quickly.

In this connection, the following means for moving the movable body 25 by a centrifugal force generated by the rotation of the spool 3 is proposed by Japanese Patent Application No. 9-214408. A tapered guide surface is formed on an inner circumferential surface of the spool 3. In the movable body 25, there is provided a braking piece which is moved in the radial direction of the spool shaft 5 by a centrifugal force generated by the rotation of the spool 3 so that the braking piece can be pushed against the guide surface. The movable body 25 is moved in the axial direction of the spool shaft 5 together with the braking piece which moves along the guide surface.

However, in the above case, it is necessary to form a tapered surface on the spool 3. Therefore, the manufacturing cost is raised when the tapered surface is machined, and further the entire profile of the spool 3 is restricted. On the other hand, when the movable body 25 is moved by the centrifugal force operation arm 34 as employed in this embodiment, the above problems can be solved, and further the degree of freedom of designing the profile of the spool 3 can be increased.

Figure 9:
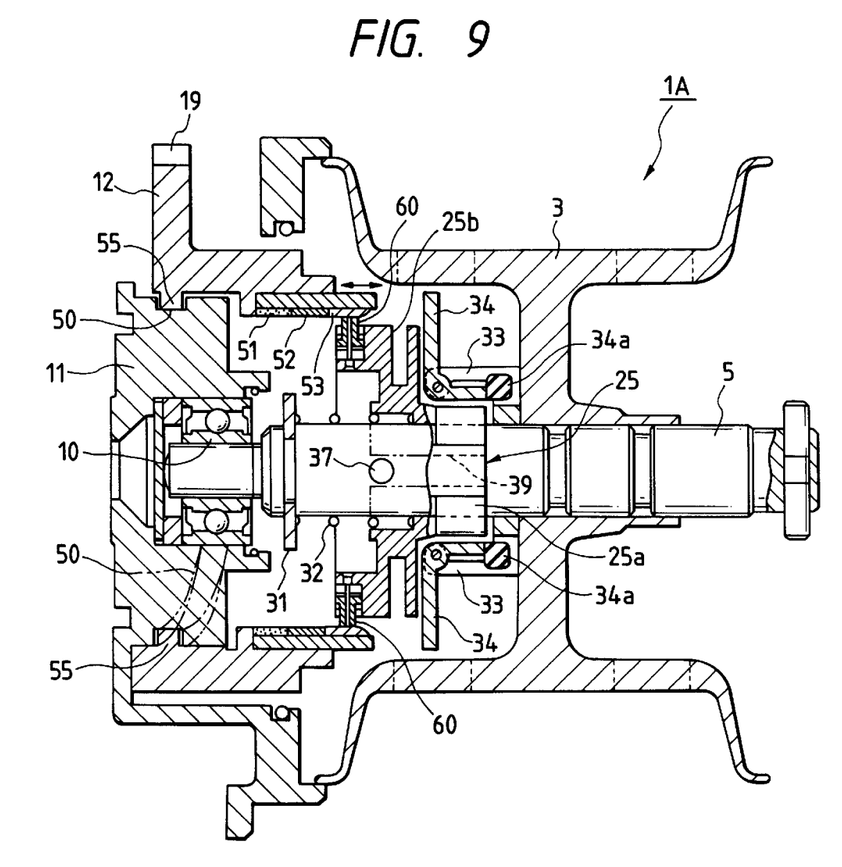
FIG. 9 is a cross-sectional view of a double bearing type reel for fishing of the second embodiment of the present invention, wherein this view corresponds to FIG. 7.
Figure 10:
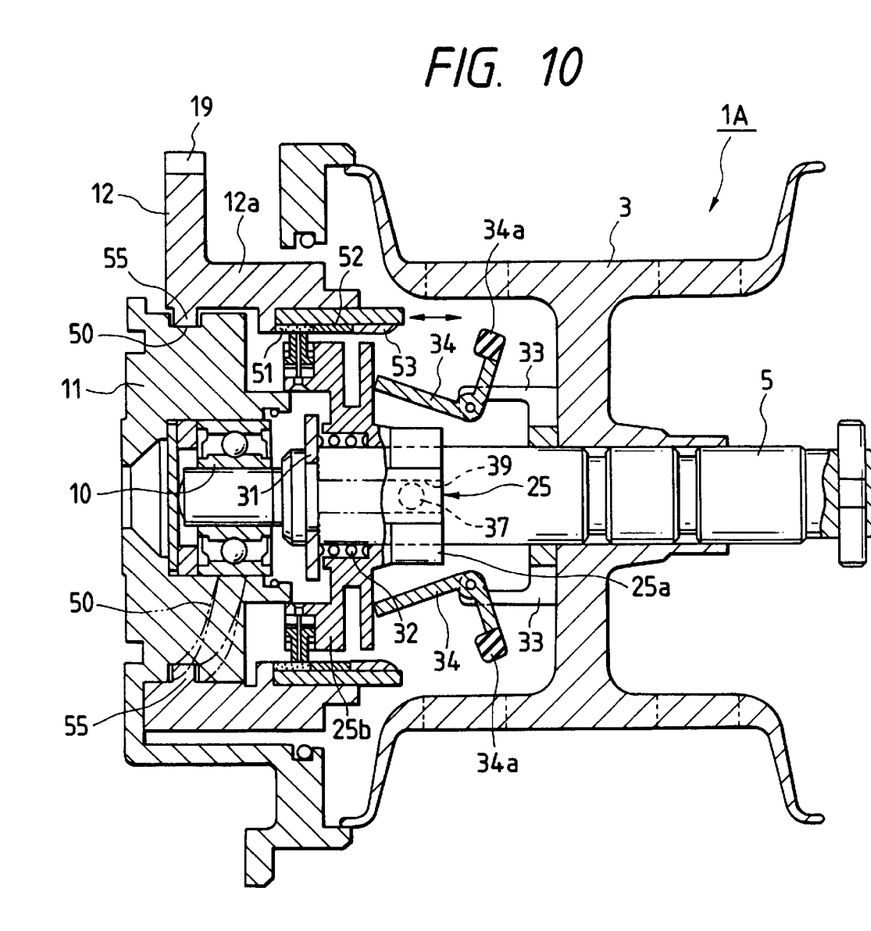
FIG. 10 is a cross-sectional view of a double bearing type reel for fishing of the second embodiment of the present invention, wherein this view corresponds to FIG. 8.

FIGS. 9 and 10 are views showing the second embodiment of the present invention. In this connection, this embodiment is a variation of the first embodiment. Like reference characters designate the same or similar parts throughout the first and the second embodiment, and the explanations are omitted here.

In the double bearing type reel 1A for fishing of this embodiment, in place of the magnets, three annular friction plates 51, 52, 53, the friction coefficients of which are different from each other, are fixed onto the inner surface of the second annular body 12. On the external surface of the first annular body 1, there is provided no magnet 1, but there is provided a spiral cam groove 50 which engages with a protrusion 55 formed on the internal surface of the second annular body 12. According to the above structure, when the braking force adjusting knob 21 is operatively rotated, the second annular body 12 is moved in the axial direction while the second annular body 12 is being rotated with respect to the first annular body 11 via the gear 22. In other words, it is possible to change the positions of the friction plates 51, 52, 53 in the axial direction.

In this connection, the coefficient of friction of the third friction plate 53, which is located most outside (on the spool 3 side), is lowest. The coefficient of friction of the second friction plate 52, which is located between the first 51 and the third friction plate 53, is higher than that of the first friction plate 53. The coefficient of friction of the first friction plate 51, which is located most inside, is highest.

On the other hand, in the flange section 25b of the movable body 25, there is provided a braking piece 60 capable of moving in the radial direction of the movable body 25 (spool shaft 5) by a centrifugal force generated by the rotation of the spool 3. When a centrifugal force is given to this braking piece 60 by the rotation of the spool 3, the braking piece 60 is capable of moving to a position outside in the radial direction at which the braking piece 60 can be contacted with the friction plates 51, 52, 53. Other points of structure of this embodiment are substantially the same as those of the first embodiment.

In the double bearing type reel 1A for fishing of the above structure, when the spool 3 is rotated, the movable body 25 is moved in the same manner as that of the first embodiment. However, in this embodiment, the braking force acting on the spool 3 is not generated by magnetism, but the braking force acting on the spool 3 is generated by friction, which is a point different from the first embodiment. That is, when the rotational speed of the spool 3 is raised and the movable body 25 is moved by a predetermined distance in the axial direction, the braking piece 60, which has been moved by a centrifugal force in the radial direction, comes into contact with the third friction plate 53, the friction coefficient of which is low. In this stage of braking operation, a low braking force caused by a low friction force is given to the spool 3. After that, in accordance with a raise in the rotational speed of the spool 3, the braking piece 60 successively comes into contact with the second friction plate 52 and the first friction plate 51. That is, the spool 3 is gradually given a higher braking force according to a raise of the rotational speed. Accordingly, the second embodiment can provide the same effect as that of the first embodiment.

As explained above, according to the double bearing type reel for fishing of the present invention, it is possible to extend a flying distance by a simple structure while the occurrence of backlash is being suppressed by an appropriate braking action.

What is claimed is:

1. A double bearing type reel for fishing comprising:

a reel body;

a spool shaft rotatably supported by the reel body;

a spool fixed to the spool shaft and rotatable integrally with the spool shaft so as to receive a fishing line therearound;

a movable body attached to the spool shaft, rotatable integrally with the spool shaft, and movable in an axial direction of the spool shaft;

a centrifugal force operation arm, rotated by a centrifugal force generated by rotation of the spool, for moving the movable body in the axial direction of the spool shaft; and a braking force generating means for generating a braking force acting on the spool via the movable body when the movable body is moved along the spool shaft, wherein the braking force corresponds to a distance of the axial movement of the movable body.

2. The double bearing type reel for fishing according to claim 1, wherein the movable body has an electric conductor moved and rotated integrally with the movable body, and the braking force generating means has a magnet for forming a magnetic field by which an electromagnetic force acts on the electric conductor so that the rotation of the electric conductor can be restricted by the magnet.

3. The double bearing type reel for fishing according to claim 1, wherein the movable body has a braking piece capable of moving radially outwardly of the movable body when a centrifugal force is given by the rotation of the movable body, and the braking force generating means has a friction plate coming into sliding contact with the braking piece and giving a frictional braking force to the movable body via the braking piece.

4. The double bearing type reel for fishing according to claim 1, wherein the braking force generating means generates no braking force until the movable body is moved along the spool shaft by at least a predetermined amount.

5. The double bearing type reel for fishing according to claim 1, wherein the centrifugal force operation arm is pivotable about an axis extending in a tangential direction with respect to the rotation of the spool.

6. The double bearing type reel for fishing according to claim 5, wherein the centrifugal force operating arm is L-shaped in section, having a first arm part, a second arm part and a connection part connecting the first arm part to the second arm part.

7. The double bearing type reel for fishing according to claim 6, wherein the axis about which the operation arm is pivotable penetrates the connection part, an end of the first arm part opposite from the connection part is contactable with the movable mody, and an end of the second arm part opposite from the connection part has a weight.

* * * * *